May 3, 1932. P. A. HABERL 1,856,551
FISHING ROD TIP
Filed April 17, 1931
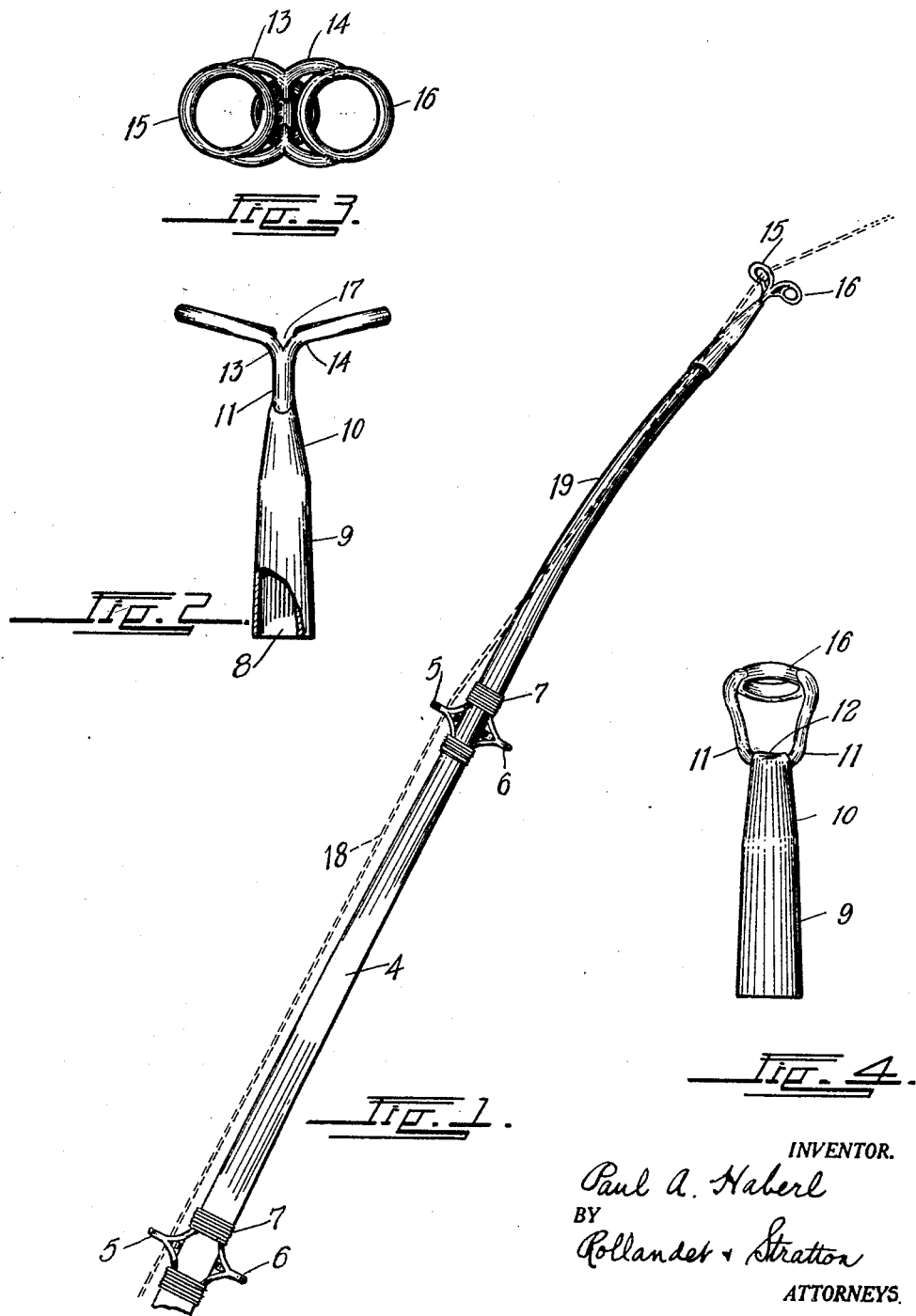
INVENTOR.
Paul A. Haberl
BY
Rollander + Stratton
ATTORNEYS.

Patented May 3, 1932

1,856,551

UNITED STATES PATENT OFFICE

PAUL A. HABERL, OF DENVER, COLORADO

FISHING ROD TIP

Application filed April 17, 1931. Serial No. 530,820.

My invention relates to tips for fishing rods. An object of the invention is to provide a strong, light-weight tip that will resist wear of line passing therethrough.

In the use of a fishing rod, especially for deep sea fishing where a fisherman endeavors to land a large fish, which sometimes takes several hours, the rod becomes bent by reason of the constant strain in one direction for such a long period.

Heretofore, fishermen and those repairing bent rods have unsuccessfully tried to find a simple, inexpensive way of straightening the rod. By the present invention, means is provided whereby the rod is bent back straight, by applying strains to the pole in the opposite direction.

It is an important object of my invention to provide means whereby the line may be placed on the opposite side of the pole without making any adjustment, displacement or repair in the pole or tip.

To carry out the foregoing objects, I have evolved a new and useful article of manufacture, hitherto unknown in the art. In the drawings like reference characters designate similar parts in the several views.

Figure 1 is a broken, perspective view of a fishing rod to which has been applied my present invention, showing its method of use.

Figure 2 is an enlarged elevation of the present tip.

Figure 3 is a plan view of the tip.

Figure 4 is an elevation of the tip.

Referring more in detail to the drawings, the reference character 4 generally designates a fishing rod. The rod carries line guides 5 and 6 held on opposite sides of the rod by cord 7 wound around the rod. The guides have been protected by my United States Letters Patent No. 1,627,643, issued May 10, 1927, to which reference is made for a more detailed description of same.

The present tip comprises a ferrule or thimble 8, attached to the end of the fishing rod 4 by any suitable means. The ferrule has a gradually tapering body portion 9 and a more abruptly tapering neck portion 10. Forked arms 11 diverge from a rounded end 12 of the ferrule. Each arm is split into tines 13 and 14. In the spaces between the tines are eyes 15 and 16, which diverge from the axis of the tip at other than a right angle. The eyes are integrally attached to the inner faces of the tines and spaced from the end of the ferrule.

A space 17 between the forked arms and between the eyes provides lightness to the tip.

In the use of the present invention, a line 18 is threaded through the guides 5 and through eye 15 of the tip. By use, the rod becomes bent, as shown at 19. In order to straighten the rod, it is a simple matter to remove the line and thread it through guides 6 and eye 16 and then the pole, by reason of its further use, will be bent back to its original straight position.

It is to be understood that changes may be made in the details of the present invention without departing from the spirit and scope of the invention.

What I claim and desire to secure by Letters Patent is:

1. As a new article of manufacture, a tip for fishing rods comprising a ferrule, arms projecting outwardly from the ferrule, tines projecting outwardly from each arm, and eyes between the tines disposed at an angle to the axis of the tip.

2. As a new article of manufacture, a tip for fishing rods comprising a ferrule, arms projecting outwardly from the ferrule, the arms being split into tines that project outwardly from opposite sides of the axis of the tip, and eyes held by the tines in such outwardly projecting position.

In testimony whereof I hereunto affix my signature.

PAUL A. HABERL.